United States Patent
Nishiguchi et al.

(10) Patent No.: US 6,247,331 B1
(45) Date of Patent: Jun. 19, 2001

(54) ABSORPTION REFRIGERATOR AND THE METHOD OF PRODUCING THE SAME

(75) Inventors: Akira Nishiguchi, Ushiku; Ryoko Sakiyama, Abiko; Tadakatsu Nakajima, Ibaraki-ken; Tomihisa Ohuchi, Tsukuba, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/497,339

(22) Filed: Feb. 3, 2000

(30) Foreign Application Priority Data

Feb. 3, 1999 (JP) .................................................. 11-025803

(51) Int. Cl.[7] .................................................. F25B 15/00
(52) U.S. Cl. .................................. 62/476; 62/484; 62/267
(58) Field of Search ................................ 62/476, 484, 267

(56) References Cited

U.S. PATENT DOCUMENTS

| | | | |
|---|---|---|---|
| 2,193,535 | * | 3/1940 | Maiuri .................................. 62/484 |
| 2,283,213 | * | 5/1942 | Katzow ................................ 62/484 |
| 4,651,819 | * | 3/1987 | Yumikura et al. ................... 165/115 |
| 5,332,546 | * | 7/1994 | Le Goff et al. ..................... 420/526 |
| 5,600,968 | * | 2/1997 | Jernqvist et al. ..................... 62/484 |
| 6,035,650 | * | 3/2000 | Winnington et al. ................. 62/105 |
| 6,122,930 | * | 9/2000 | Nishiguchi et al. ................... 62/476 |
| 6,158,237 | * | 12/2000 | Riffat et al. ........................... 62/484 |

FOREIGN PATENT DOCUMENTS

| | | |
|---|---|---|
| 59-18355 | 1/1984 | (JP) . |
| 4-268171 | 9/1992 | (JP) . |
| 11-264623 | 9/1999 | (JP) . |

* cited by examiner

Primary Examiner—William Doerrler
Assistant Examiner—Mark S. Shulman
(74) Attorney, Agent, or Firm—Crowell & Moring, L.L.P.

(57) ABSTRACT

Refrigerant vapor generated in a high temperature regenerator is condensed in a condenser, and the refrigerant vapor is changed to refrigerant liquid. Then it is conducted to a first evaporator. The refrigerant vapor evaporated in the first evaporator is absorbed in a solution in a first absorber. The refrigerant liquid conducted from the condenser without vaporizing in the first evaporator is introduced to a second evaporator, and it evaporates in the second evaporator. The refrigerant vapor in the second evaporator is absorbed in the solution in a second absorber. The first and the second evaporator and the first and the second absorber are made of a unitary chamber. The first evaporator is juxtaposed to the second absorber with a heat transfer member. The concentration of the refrigerant in the second evaporator is controlled by a refrigerant liquid controller that controls a flow rate of the refrigerant liquid flowing from the first evaporator at the predetermined value.

20 Claims, 4 Drawing Sheets

ABSORPTION REFRIGERATOR AND THE METHOD OF PRODUCING THE SAME

BACKGROUND OF THE INVENTION

This invention relates to an absorption refrigerator and the method of the producing the same, and more particularly, to an absorption refrigerator having two absorbers and two evaporators arranged in a two-stage manner which can pump up heat from low temperature to high temperature with a large temperature difference.

An example of an absorption refrigerator is shown in the Japanese Paten Laid-open 59-18355/1984 that has two absorbers and two evaporators arranged in a two-stage manner and that is capable of pumping up heat with the large temperature difference. The absorption refrigerator shown in this prior art has a low temperature evaporator and a low temperature absorber besides an evaporator and an absorber that are provided in an conventional absorption refrigerator. Refrigerant liquid condensed in a condenser evaporates and vaporizes in the evaporator, then the refrigerant vapor is absorbed into a concentrated solution in the absorber. A part of the refrigerant liquid which did not evaporate in the evaporator evaporates in the low temperature evaporator, then it flows into the low temperature absorber. As a result, it is absorbed into a middle concentrated solution which is the diluted solution.

Another example of the absorption refrigerator is described in the Japanese Patent Laid-open 4-268171/1992 that has absorbers arranged in a two-stage manner and that is capable of pumping up heat with the large temperature difference. This absorption refrigerator provides a mid-absorption room and a mid-evaporation room between an evaporation room and an absorption room. In a heating mode, refrigerant liquid condensed in a condenser is introduced to the evaporation room, and the refrigerant liquid that could not evaporate in the evaporation room is introduced to the mid-evaporation room. That is, the refrigerant liquid flows into the evaporation room and the mid-evaporation room in series.

There is an advantage that the absorption heat pump shown in the Japanese Patent Laid-open 59-18355/1984 can pump up heat from the low temperature to the high temperature because of having a two-stage type evaporator-absorber. The solution in the low temperature absorber absorbs the refrigerant vapor and rises its temperature in the absorption refrigerator. This solution is conducted to the high temperature evaporator through a bypassed return conduit of the refrigerant liquid. This causes the temperature difference for heat transfer to be large and the performance of an absorption cycle to be low because the refrigerant temperature at a discharge of the absorber is higher than the evaporation temperature of the refrigerant. In addition, the pumping power for circulating the refrigerant from the evaporator to the absorber it is also needed.

By the way, the refrigerant liquid is supplied from the evaporator room of lower temperature side to the mid-evaporating room of higher temperature side sequentially in heating operation in the Japanese Patent Laid-open 4-268171/1992. Thus, the absorption cycle can be used even in the heating operation. However, this absorption refrigerator does not work as an absorption refrigerator having absorbers and evaporators arranged in a two-stage manner but works as a conventional absorption refrigerator having single stage absorber in the cooling operation. Thus, it can not pump up cold below 0° C. This absorption refrigerator transports heat from the mid-absorption room to the mid-evaporation room with heat pipes. The temperature difference for heat transport may become larger and the performance of the absorption cycle will be degenerated. It is needed that both of the temperature difference between the solution and the substances in the heat pipes and the temperature difference between the substances in the heat pipes and the refrigerant vapor are larger than the temperature difference that the heat exchange can occur. Therefore, it is desired that the absorption refrigerator is free from the above inconveniences.

BRIEF SUMMARY OF THE INVENTION

Accordingly, it is an object of the present invention to realize an absorption refrigerator having absorbers and evaporators arranged in a two-stage manner with the high absorption cycle performance.

It is another object of the present invention to realize an absorption refrigerator having absorbers and evaporators arranged in a two-stage manner with the simple structure and low cost.

It is still another object of the present invention to realize an absorption refrigerator having absorbers arranged in a twostage manner that is suitable for pumping up the cold below 0° C. from the low temperature side evaporator.

A first characteristic feature of the present invention to achieve the above objects resides in an absorption refrigerator having a first evaporator, a first absorber, a regenerator, and a condenser comprising a second evaporator conducting a refrigerant liquid accumulated in the first evaporator; a second absorber absorbing the refrigerant vapor evaporated in the second evaporator; refrigerant liquid control means controlling flow rate of the refrigerant flowing from the first evaporator for keeping the concentration of the refrigerant liquid in the second evaporator to the predetermined value; and a heat transfer member interposed between the first evaporator and the second absorber; wherein the first evaporator, the second evaporator, the first absorber and the second absorber are made of a unitary chamber.

Preferably, the heat transfer member is a corrugated plate extending in the vertical direction; the absorption refrigerator further comprises a conduit introducing a solution from the first absorber to the second absorber, and heat exchange means exchanging heat between a diluted solution accumulated in the second absorber and the solution introduced in the second absorber; the refrigerant liquid control means further comprises level height detecting means detecting a level height of the refrigerant liquid in the second evaporator and a control valve disposed in a flow passage for the refrigerant liquid from the first evaporator to the second evaporator.

A second characteristic feature of the present invention to achieve the above objects resides in an absorption refrigerator having a regenerator, a condenser condensing a refrigerant vapor generated in said regenerator, a first evaporator evaporating a refrigerant liquid condensed in said condenser and a first absorber absorbing the refrigerant vapor evaporated in the first evaporator into a solution comprising a second evaporator introducing the refrigerant liquid accumulated in the first evaporator; a second absorber absorbing the refrigerant liquid evaporated in the second evaporator into the solution; and a heat transfer member interposed between the first evaporator and the second absorber; wherein the second evaporator, the second absorber, the first evaporator and the first condenser are located in this order and are made of a unitary chamber, and the refrigerant liquid condensed in the condenser is introduced to the second evaporator passing through the first evaporator.

Preferably, the absorption refrigerator further comprises communicating means for communicating the refrigerant liquid accumulated at a bottom of the first evaporator with the refrigerant liquid accumulated at a bottom of the second evaporator; the heat transfer member is corrugated in the horizontal direction.

Further, it is preferable that the heat transfer member is a plate having a concave portion and a convex portion on a surface of the plate and extending in the vertical direction.

Preferably, the absorption refrigerator further comprises refrigerant liquid sprinkling means sprinkling the refrigerant liquid over and in the vicinity of the heat transfer member facing to the first evaporator and solution sprinkling means sprinkling the solution over and in the vicinity of the heat transfer member facing to the second absorber, and the refrigerant liquid sprinkling means is located upper than the solution sprinkling means.

Further, it is preferable to provide the absorption refrigerator which comprises solution concentration detecting means for detecting a refrigerant concentration in the second evaporator, refrigerant liquid flow adjusting means for adjusting a flow rate of the refrigerant liquid passing through the communicating means, and control means for controlling the refrigerant liquid flow adjusting means based on concentration of the refrigerant detected by the refrigerant concentration detecting means.

It is still preferable to provide the absorption refrigerator which comprises level height detecting means of the refrigerant liquid for detecting a level height of the refrigerant liquid in the second evaporator, refrigerant liquid flow adjusting means for adjusting a flow rate of the refrigerant liquid passing through the communicating means, and control means for controlling the refrigerant liquid flow adjusting means based on a concentration of the refrigerant detected by the refrigerant concentration detecting means.

Preferably, the control means further comprises memory means memorizing at least one of a target value of the refrigerant concentration, an upper limit of the refrigerant liquid level height and a lower limit of the refrigerant liquid level height.

Preferably, the absorption refrigerator further comprises solution supplying means for supplying a portion of the solution being supplied to the second absorber to the second evaporator.

A third characteristic feature of the present invention to achieve the above objects resides in a method of producing an absorption refrigerator having a first evaporator, a first absorber, a second evaporator, a second absorber, a regenerator and a condenser comprising steps of: (a) welding all-round of a heat transfer member interposed between the first evaporator and the second absorber at a basal surface and both side surfaces of a rectangular parallelepiped chamber including the first absorber, the first evaporator, the second absorber and the second evaporator; (b) disposing a solution sprinkling device and a refrigerant liquid sprinkling device; and ( ) welding all-round of the top surface divided by a portion of the first evaporator and a portion of the second absorber.

An absorption heat generated at the second absorber is transferred directly to the refrigerant liquid flowing on the first evaporator-side surface of the heat transfer member between the first evaporator and the second absorber by way of the heat transfer member itself. Then, the temperature difference needed for heat transfer can be made small, and the performance drop of the absorption cycle can be prevented. In addition, the heat transfer member is used for the heat transfer from the second absorber to the first evaporator instead of heat pipes, it is economical to produce the absorption refrigerator. Since the refrigerant pump provided to the first evaporator and the solution pump provided in the second absorber only work for sprinkling the refrigerant or the solution, the power for the pumps can be made small.

The refrigerant liquid flowing from the condenser is supplied to the first evaporator and the second evaporator in series. The refrigerant in the first evaporator does not mix with the solution, when the refrigerant liquid in the second evaporator is mixed with the solution in case of taking out the cold of 0 degree or less from the second evaporator. Therefore, the heat transfer performance in the first evaporator can be prevented from lowering. An aperture formed at the refrigerant supply means to the second evaporator is opened to the liquid collected in the bottom of the second evaporator, the refrigerant supplied to the second evaporator is prevented from freezing.

According to the present invention, since the absorption heat of the second absorber is transferred to the refrigerant flowing on the heat transfer member of the first evaporator through the heat transfer member disposed between the first evaporator and the second absorber, the temperature difference can be made small in the heat transfer and the performance of the absorption cycle can be improved.

DETAILED DESCRIPTION OF THE INVENTION

Figure 1:
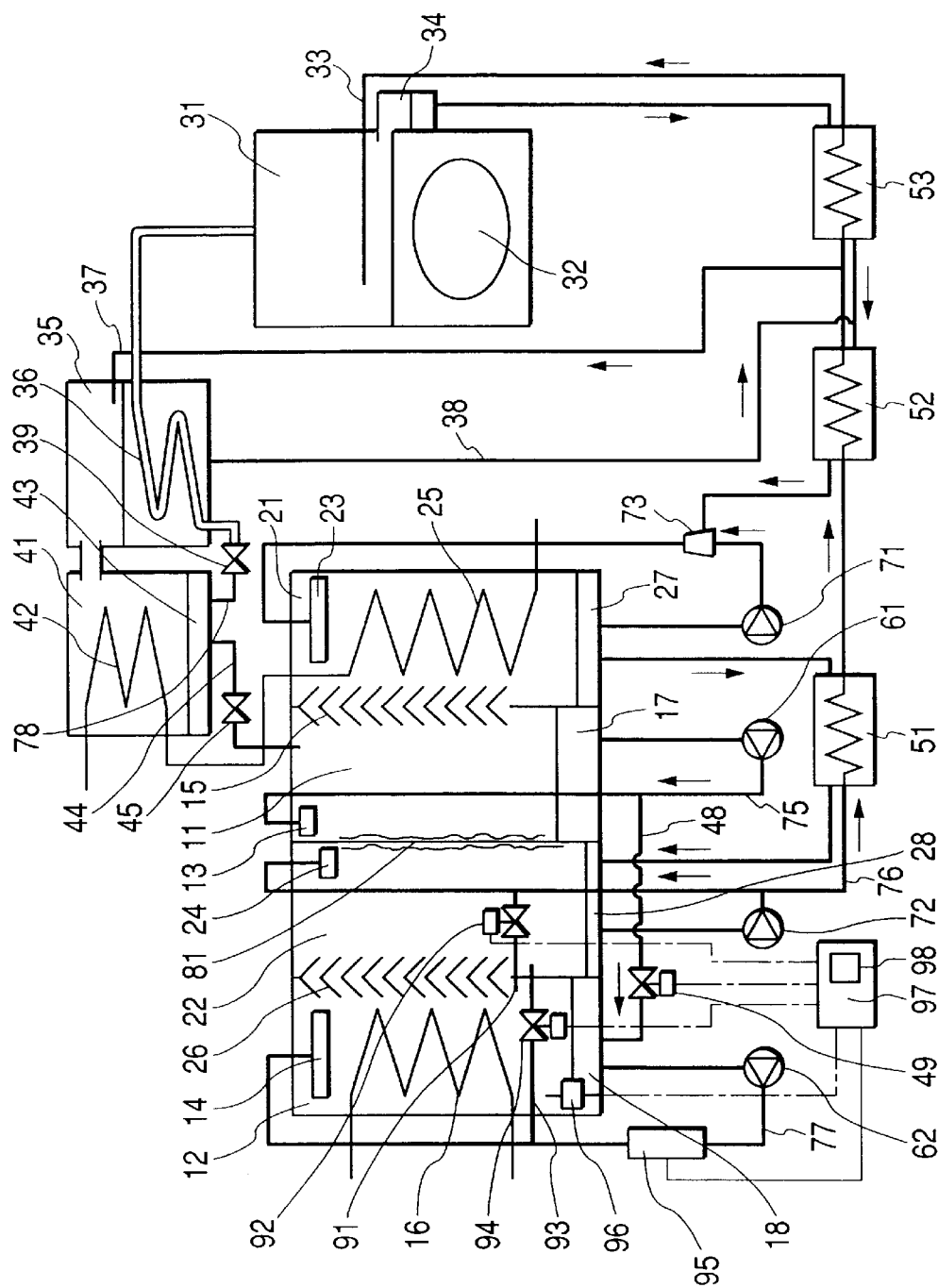
FIG. 1 shows a system diagram of an embodiment of an absorption refrigerator of the present invention.

Several embodiments of the present invention will be described with reference to the drawings. FIG. 1 is a system diagram of an absorption refrigerator having two absorbers and two evaporators concerning with the present invention. The absorption refrigerator has a first evaporator 11, a second evaporator 12, a first absorber 21, a second absorber 22, a high temperature regenerator 31, a low temperature regenerator 35, a condenser 41, solution heat exchangers 51, 52, 53, refrigerant pumps 61,62, solution pumps 71,72, and etc.

Concretely, refrigerant vapor is generated from solution heated by a combustor 32 of the high temperature regenerator 31, and it is introduced to the low temperature regenerator 35. Then, the refrigerant vapor is condensed in the low temperature regenerator 35, and it flows into condenser 41. The low temperature regenerators 35 and the condenser 41 constitute a unitary chamber. Refrigerant liquid condensed in the condenser 41 is introduced to the first evaporator 11. The refrigerant vapor generated in the first evaporator 11 is absorbed into the solution in the first absorber 21. The first evaporator 11 and the first absorber 21 constitute a unitary chamber.

The second absorber 22 is juxtaposed the first evaporator 11. The refrigerant evaporates in the second evaporator 12 constituting the unitary chamber with the second absorber 22, and it is absorbed into the solution in the second absorber 22. The solution heat exchangers 52, 53 are disposed at conduits which conduct the concentrated solution generated in the high temperature regenerator 31 and the low temperature regenerator 35 to the second absorber 22. The solution heat exchanger 51 is disposed at a conduit which conducts the solution in the first absorber 21 to the second absorber 22.

A refrigerant pump 61 is disposed at the downward of the first evaporator 11 in order to sprinkle the refrigerant liquid accumulated at the bottom of the first evaporator 11 inside of the first evaporator 11. Similarly, a refrigerant pump 62 is disposed at the downward of the second evaporator 12 in order to sprinkle the refrigerant liquid accumulated at the bottom of the second evaporator 12 inside of the second evaporator 12. There is the solution pumps 71 below the first absorber 21 in order to sprinkle the solution inside of the first absorber 21, and there is a solution pump 72 below the second absorber 22 in order to sprinkle the solution inside of the second absorber 22, respectively. The absorbent is lithium bromide and the refrigerant is water in this embodiment.

An operation of the absorption refrigerator shown above is described in detail. The first evaporator 11 and the second absorber 22 is partitioned by a heat transfer members 81. Then, both have made this heat transfer member to be a component. Refrigerant liquid flows from condenser 41 to the first evaporator 11, and it is accumulated in a refrigerant tank 17 formed at the lowermost of the first evaporator 11. The refrigerant pump 61 sends the refrigerant to a sprinkling device 13 located upper portion of the first evaporator 11. The sprinkling device 13 sprinkles the refrigerant liquid from a first evaporator side of the heat transfer member 81 constituting the boundary with the second absorber 22.

The sprinkled refrigerant liquid cools the solution flowing down a second absorber side of the heat transfer member 81 by vaporization heat when it evaporates on the heat transfer member 81. Heat transfer tubes are disposed in the first absorber, and cooling water flows inside of them. The concentrated solution concentrated in the regenerator 31 mixes with the solution accumulated at a solution tank 27 disposed at a bottom of the first absorber 21. The mixed liquid of the concentrated solution and the solution is sprinkled over the heat transfer tubes 25 from a sprinkling device 23 placed at an upper portion of the first absorber 21. The solution sprinkled from the sprinkling device 23 absorbs the refrigerant vapor evaporated in the first evaporator 11.

The pressure inside of the first evaporator 11 is kept low because the solution absorbs the refrigerant. As a result, it can evaporate continuously the refrigerant sprinkled over the heat transfer member 81 facing to the first evaporator. As the cooling water is flowing inside of the heat transfer tubes 25, it can cool the solution heated by the absorption heat generated when the solution absorbs the refrigerant vapor. The solution absorbs the refrigerant vapor and dilutes. The diluted solution is sent by a solution pump 71 to an ejector pump 73 disposed at a conduit for sending the solution from the solution tank 27 to the sprinkling device 23.

The solution flowing into the ejector pump 73 mixes with the concentrated solution conducted from both of the low temperature regenerator 35 and the high temperature regenerator 31 to the solution heat exchanger 52, then it is conducted to the sprinkling device 23. The solution tank 27 of the first absorber 21 communicates with the solution tank 28 of the second absorber 22 through the solution heat exchanger 51. Since an amount of the solution in the solution tank 27 increases by the amount of the solution sucked by the ejector pump 73 and by the amount of the refrigerant vapor absorbed at the first absorber 21, the solution in the solution tank 27 is introduced to the solution tank 28 of the second absorber 22 through the solution heat exchanger 51 by these amounts.

Heat transfer tubes 16 are disposed in the second evaporator 12. The chilled water or brine flow inside of the heat transfer tubes 16. There is a conduit 75 that conducts the refrigerant to the sprinkling device 13 located at an upper portion of the first evaporator 11 by the refrigerant pump 61 of the first evaporator 11. A conduit 48 branches off from the conduit 75 to conduct the refrigerant to a refrigerant tank 18 located in a bottom of the second evaporator 12. The end portion of the conduit 48 is connected to a basal plane of the refrigerant tank 18 where the refrigerant state is liquid. The refrigerant is introduced from a refrigerant tank 17 of the first evaporator 11 to the refrigerant tank 18 of the second evaporator 12 through a conduit 48. A control valve 49 provided at the middle of the conduit 48 controls the flow rate of the refrigerant conducted from the first evaporator 11 to the second evaporator 12. The refrigerant in the refrigerant tank 18 is mixed with the solution, and the concentration of the refrigerant is controlled. Control method of the concentration of this mixed refrigerant will be described later.

The refrigerant liquid in the refrigerant tank 18 of the second evaporator 12 is introduced to a sprinkling device 14 placed at the upper portion of the second evaporator 12 through a concentration detector 95 by the refrigerant pump 62. Then, the refrigerant liquid is sprinkled over the heat transfer tubes 16 by the sprinkling device 14. The refrigerant liquid cools chilled water or brine flowing inside of the heat transfer tubes 16 by virtue of vaporization heat when it evaporates on the surface of the heat transfer tubes 16.

The solution accumulated in the solution tank 28 formed at the bottom of the second absorber 22 is conducted to a sprinkling device 24 placed at the upper portion of the second absorber 22, and it is sprinkled over the second absorber side of the heat transfer member 81 which forms the boundary with the first evaporator 11. The sprinkled solution is cooled by the refrigerant which flows over the first evaporator side surface of the heat transfer member 81 with vaporization heat. Then, the mixed refrigerant evaporates in the second evaporator 12, and the sprinkled solution absorbs the refrigerant vapor flowing into the second absorber. By this absorption effect, the pressure inside of the second evaporator 12 is kept low, and it makes it possible to continuously evaporate the refrigerant sprinkled over the heat transfer tubes 16 in the second evaporator 12.

The solution absorbs the refrigerant vapor in the second absorber 22, the concentration of the solution is diluted and the solution accumulates in the solution tank 28. A solution pump 72 conducts the accumulated solution to the sprinkling device 24 of the second absorber 22 and the solution heat exchanger 51. A conduit 91 that conducts the solution to the refrigerant tank 18 of the second evaporator 12 branches from the middle point of a conduit 76 that conducts the solution by the solution pump 72 from the solution tank 28 to the sprinkling device 24 of the second absorber 22. The flow rate of the solution flowing inside of the branched conduit 91 is controlled by a control valve 92 provided at the conduit 91.

A level height detector 96 detecting the refrigerant level height is provided in the refrigerant tank 18 of the second evaporator 12. A conduit 93 that conducts the refrigerant to the solution tank 28 of the second absorber 22 branches from the middle point of a conduit 77 that conducts the refrigerant by the refrigerant pump 62 from the refrigerant tank 18 to the sprinkling device 14 of the second evaporator 12. A control valve 94 disposed at the conduit 93 controls the flow rate of the refrigerant flowing through the branched conduit 93.

A control equipment 97 is provided to control the opening of the valves and start/stop of the pumps. The control equipment 97 is input signals from concentration detecting means 95 for detecting the concentration of the refrigerant sprinkled inside of the second evaporator 12 and from level height detecting means 96 detecting the refrigerant level height in the refrigerant tank 18. The control equipment 97 controls the refrigerant flow rate flowing into the second evaporator 12 with the control valve 49, the solution flow rate flowing from the second absorber 22 to the second evaporator 12 with the control valve 92, and the refrigerant flow rate flowing from the second evaporator 12 to the second absorber 22 with the control valve 94 to make sure of the detected concentration of the refrigerant being a predetermined value.

The control equipment 97 further provides memory means 98 memorizing a target value of the refrigerant concentration of the second evaporator 12. The memory means 98 also memorize an upper limit and a lower limit of the level height of the refrigerant accumulated in the refrigerant tank 18 of the second evaporator 12.

The control equipment 97 closes the control valve 49 if the refrigerant concentration is lower than the target concentration, and it opens control valve 49 if the refrigerant concentration is higher than the target concentration. Thus, the concentration of the mixed refrigerant in the refrigerant tank 18 is kept constant.

The control valve 94 is closed if the level height of the refrigerant tank 18 is lower than the upper limit, and the control valve 94 is opened for the predetermined time interval if the level height is also higher than the upper limit. On the contrary, the control valve 92 is opened for predetermined time interval if the level height is lower than the lower limit, and the control valve 92 is closed if the level height is higher than the lower limit.

Water contained in the mixed refrigerant of the second evaporator evaporates in the second evaporator 12 when the sprinkling device 14 sprinkles it, and it remains saline (in this case, lithium bromide, which is the solute). Therefore, it is possible to control the concentration to the target value, after the target concentration has been once achieved, by controlling the refrigerant inflow of the first evaporator 11 from the refrigerant tank 17 according to the change of the concentration. As a result, it is not needed to add or to pick out the solute.

However, it is necessary to supply the solution if the solute is flown out with droplets of the mixed refrigerant during the refrigerant sprinkling or other time. If the solute is flown out, the concentration of the mixed refrigerant becomes thin. Then, the level of the refrigerant tank 18 lowers in order to keep the refrigerant concentration constant. At that time, if the level height of the refrigerant in the refrigerant tank 18 becomes below the lower limit, the control valve 92 is opened for predetermined time interval and the solution is supplied. The level height rises according to the solution supply and the concentration of the mixed refrigerant increases. The concentration of the mixed refrigerant would be kept to the target value, if the concentration is retained the target value. The control equipment 97 controls each control valve so as to keep the concentration constant by increasing the inflow rate of the refrigerant etc., if the concentration of the mixed refrigerants is higher than the target value.

On the contrary, if the solution in the second absorber 22 flows into the refrigerant tank 18 due to the sprinkling of the droplets, it is needed to flow out the solution outside of the second evaporator 12. The level height of the refrigerant tank 18 rises so as to keep the concentration of the refrigerant constant in this case. If the level height of the mixed refrigerant in the refrigerant tank 18 rises and it exceeds the upper limit, the control valve 94 opens for predetermined time interval and the mixed refrigerant flows out to the solution side. Consequently, the solute is picked out and the level height is lowered. The concentration of the mixed refrigerant is controlled to the predetermined value by increasing the supply refrigerant from the first evaporator or the like.

The solution introduced by the solution pump 72 from the solution tank 28 of the second absorber 22 to the solution heat exchanger 51 exchanges heat with the solution introduced from the first absorber 21 at the solution heat exchanger 51, then the solution is conducted to the solution heat exchanger 52. The solution conducted into the solution heat exchanger 52 exchange heat with the solution flowing from the high temperature regenerator 31 and the low temperature regenerator 35 in the solution heat exchanger 52. Then, the temperature of the solution rises. Afterwards, a portion of the solution is conducted to the low temperature regenerator 35 through an intake pipe 37 of the solution, and the other portion of the solution is conducted to the high temperature regenerator 31 through the solution heat exchanger 53 and an intake pipe 33 of the solution.

The solution conducted to the high temperature regenerator 31 is heated and boiled by a combustor 32 provided with the high temperature regenerator 31, and the refrigerant vapor evaporated from the solution is conducted to the low temperature regenerator 35. The concentrated solution evaporated the refrigerant vapor is conducted from a solution outlet 34 of the high temperature regenerator to the solution heat exchanger 53. The concentrated solution exchanges heat with the solution flowing from the solution tank 28 of the second absorber 22 to the solution heat exchanger 52.

Heat transfer tubes 36 is disposed inside of the low temperature regenerator 35 and the refrigerant vapor conducted from the high temperature regenerator 31 flows inside of the heat transfer tubes 36. The solution conducted to the low temperature regenerator 35 through the solution heat exchanger 52 is heated and boiled by vapor flowing inside of the heat transfer tubes 36 and generates the refrigerant vapor. The generated refrigerant vapor is conducted to the condenser 41.

The solution concentrated and evaporating the refrigerant vapor in the low temperature regenerator 35 flows through a solution outflow pipe 38 communicating a basal plate of the low temperature regenerator 35. Then, it mixes with the solution conducted from the high temperature regenerator 31 through the solution heat exchanger 53. The concentrated solution is conducted to the solution heat exchanger 52 and it exchanges heat with the solution flowing from the solution heat exchanger 51. The concentrated solution is conducted to the suction side of an ejector pump 73 and it mixes with the solution conducted from the solution tank 27 of the first absorber 21 by the solution pump 71. Finally, it flows into the sprinkling device 23 of the first absorber 21. The refrigerant in heat transfer tubes 36 conducted from the high temperature regenerator heats the solution and condenses itself in the low temperature regenerator 35, and it is conducted to the refrigerant tank 43 disposed at the bottom of the condenser 42 through a conduit 78 providing a restrictor 39.

Heat transfer tubes 42 are disposed inside of the condenser 41, and the cooling water flown through the first absorber 21 flows inside of the heat transfer tubes 42. The refrigerant vapor conducted from the low temperature regenerator 35 exchanges heat with the cooling water flowing inside of the heat transfer tubes 42 at a surface of the heat transfer tubes 42, then it condenses. The refrigerant liquid is accumulated in a refrigerant tank 43 disposed at a bottom of the condenser 41. The refrigerant liquid in the refrigerant tank 43 mixes with the refrigerant liquid flowing from the low temperature regenerator 35. Then, it is conducted to the first evaporator 11 through a refrigerant conduit 44 that has a restrictor 45 and that communicates the condenser 41 and the first evaporator 11.

There are two flow passages in this embodiment as described above. One is a passage for conducting the solution to the refrigerant tank of the second evaporator. The other is a passage for conducting the refrigerant from this refrigerant tank to the second absorber. The flow rates of the solution and the refrigerant flowing into the second evaporator and the flow rate of the refrigerant flowing out from the second evaporator are controlled based on the signal from the refrigerant concentration detector and the level height detector provided with the second evaporator. Thus, the concentration of the refrigerant is kept constant. Therefore, it is possible to keep the concentration of the refrigerant above the concentration that the refrigerant freezes and it is also possible to continuously evaporate the refrigerant below 0° C. As a result, the low temperature brine can be supplied.

Figure 2:
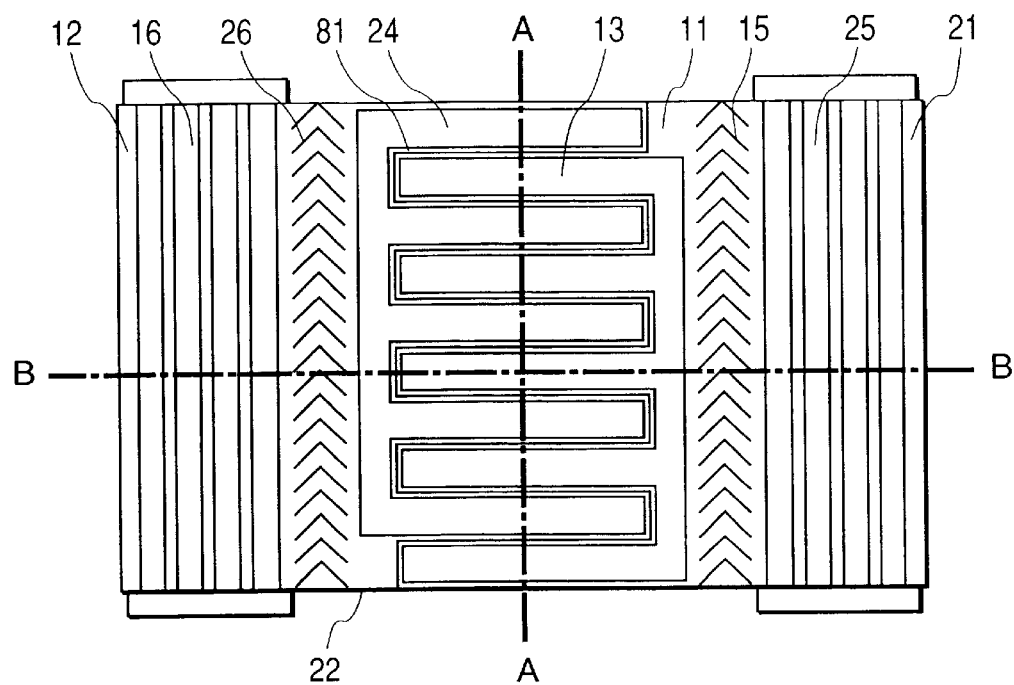
FIG. 2 shows a plain view of an embodiment of a chamber forming evaporators and absorbers of the present invention.
Figure 3:
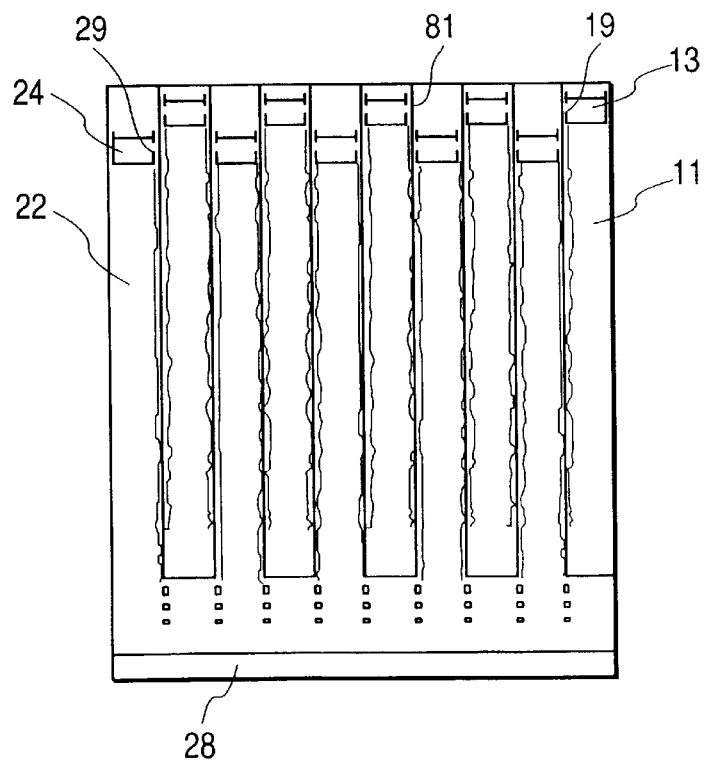
FIGS. 3 and 4 are sectional views from the A—A line and the B—B line drawn in FIG. 2, respectively.
Figure 4:
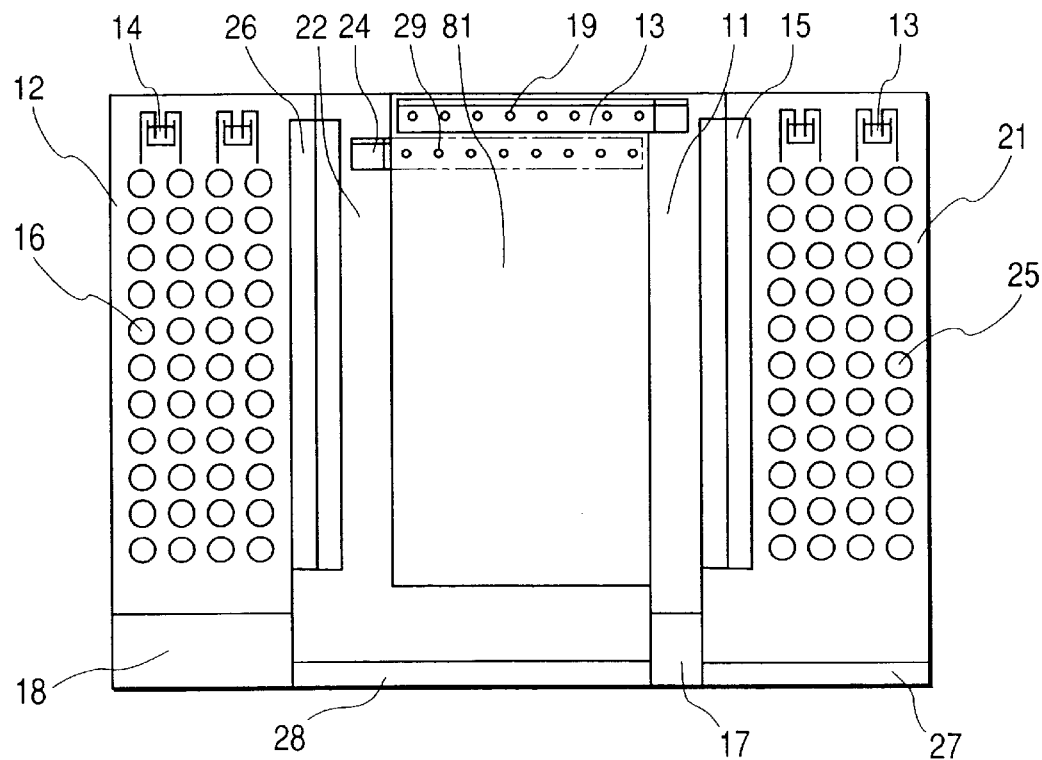

Next, another embodiment of the present invention is explained using FIGS. 2 to 4. FIG. 2 is a plan view of a unitary chamber comprising evaporators and absorbers used in the absorption refrigerator having two absorbers and two evaporators arranged in a two-stage manner. A top plate is removed in this FIG. 2. FIG. 3 is an A—A cross section viewed from the left hand side of FIG. 2, and FIG. 4 is a B—B cross section viewed from the bottom of FIG. 2. As the conduits around the chamber is the same as the embodiment shown in FIG. 1, they are omitted in the FIGS. 2 to 4.

A unitary chamber including evaporators and absorbers provides a first evaporator, a first absorber, a second evaporator and a second absorber. There is a heat transfer member 81 that partitioning the first evaporator 11 and the second absorber 22 and that extending in the vertical direction with corrugating. A sprinkling device 13 of the first evaporator 11 and a sprinkling device 24 of the second absorber 22 is provided in an upper portion of the heat transfer member 81 along the heat transfer member 81. A liquid film of refrigerant is formed on the heat transfer member 81 facing to the first evaporator 11 and a liquid film of solution is formed on the heat transfer member 81 facing to the second absorber 22, respectively.

Absorption heat is generated, when the liquid film of the solution in the second absorber 22 absorbs refrigerant vapor. This absorption heat is transferred to the refrigerant liquid film formed in the first evaporator 11 through the heat transfer members 81. Then, it makes the refrigerant liquid evaporate. That is, the absorption heat is transported from the second evaporator 12 to the first evaporator 11. The sprinkling devices 13, 24 have a narrow clearance with the heat transfer member 81. These sprinkling devices 13, 24 have a plurality of sprinkling holes 19, 29 on surfaces facing to the heat transfer member 81.

The bottom of the heat transfer member 81 is closed at the first evaporator 11 side. The refrigerant is collected into the refrigerant tank that has flown down on the heat transfer member 81 facing to the first evaporator 11 and that does not evaporate. The solution flowing down on the heat transfer surface 81 facing to the second absorber drops from an outside of a closed bottom edge of the heat transfer member 81 and is collected into a solution tank disposed downward.

Heat transfer tubes 25 is disposed in the first absorber 21 horizontally, and cooling water flows inside of the heat transfer tubes 25. The refrigerant vapor evaporated in the first evaporator 11 flows into the first absorber 21 through an eliminator 15, then, it is absorbed in the solution sprinkled from the sprinkling device 13 above the heat transfer tubes 25. Absorption heat generated during the absorption of the refrigerant vapor is deprived by the cooling water flowing inside of the heat transfer tubes 25. A diluted solution having absorbed the refrigerant vapor is collected into the solution tank 27.

Heat transfer tubes 16 are disposed horizontally in the second evaporator 12, and chilled water or brine flows inside of the heat transfer tubes 16. The refrigerant liquid is sprinkled over the heat transfer tubes 16 from the sprinkling device 14. The sprinkled refrigerant liquid deprives heat from the chilled water or brine flowing inside of the heat transfer tubes 16, then evaporates. The evaporated refrigerant vapor is conducted to the second absorber 22 through an eliminator 26. The refrigerant that have not evaporated on the heat transfer tubes 16 is accumulated in the refrigerant tank 18.

It is possible to make an absorption refrigerator small in this embodiment, because the heat transfer member is disposed horizontally with corrugated manner and the heat transfer member having large heating area is achieved in a small volume. As the sprinkling device 13 of the first evaporator 11 is disposed upper than the sprinkling device 24 of the second absorber 22 and it is prevented the refrigerant flown from the sprinkling device 13 from heating by the solution just flown from the sprinkling device 24, the refrigerant vapor does not generate around the sprinkling device 13. Thus, it is prevented that flow rate of the sprinkled refrigerant becomes non-uniform caused by the generated refrigerant vapor.

Figure 5:
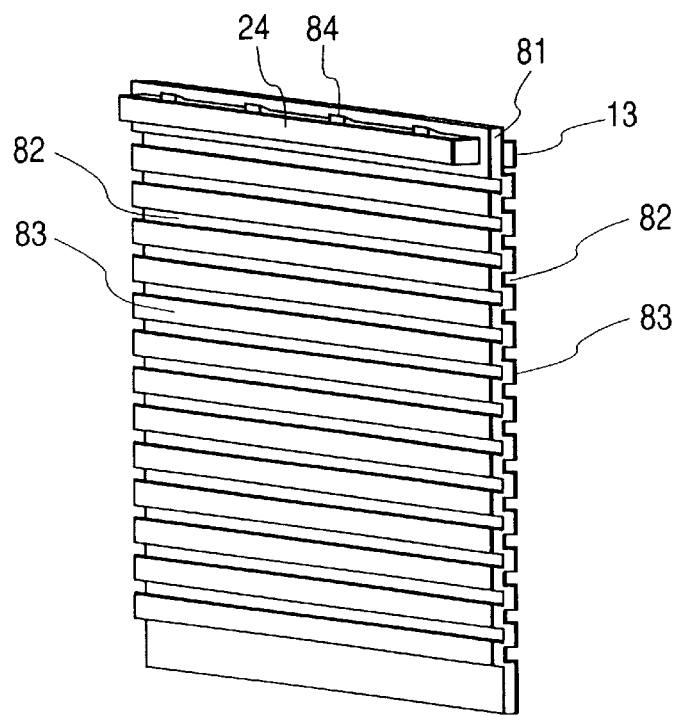
FIGS. 5 and 6 are a perspective view of an embodiment of the heat transfer member and the sprinkling device of the present invention, respectively.
Figure 6A:
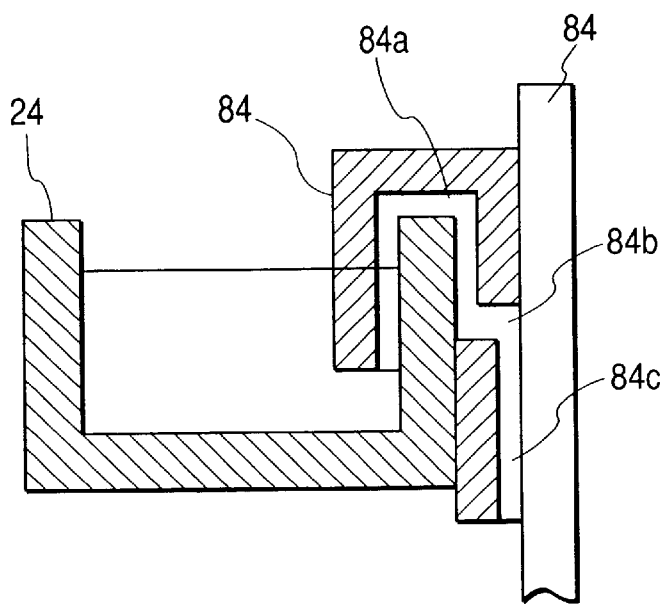
Figure 6B:
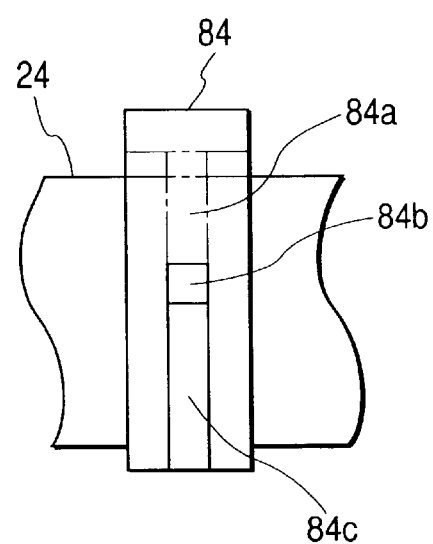

Next, an embodiment of the heat transfer member and the sprinkling device used in the absorption refrigerator is explained using FIGS. 5 and 6. A plurality of fine concave portions and a plurality of fine convex portions are formed nearly in the horizontal direction on the surfaces of the heat transfer member 81. Sprinkling devices 13, 24 are disposed at both sides and upward of the heat transfer member 81 along the heat transfer member 81. In addition, a plurality of liquid dropping devices 84 are disposed between the sprinkling devices 13,24 and the heat transfer member 81.

The liquid dropping devices 84 are put on a side wall of the sprinkling device 13, 24 facing to the heat transfer member 81 in a manner of reverse U-shape as shown in FIG. 6. An outside surface of the liquid dropping device 84 contacts the heat transfer member 81 (confer FIG. 5). A groove 84a is formed inside of the reverse U-shape of the liquid dropping device 84, and a groove 84c is formed outside of the liquid dropping device 84. The groove 84a communicates with the groove 84c at an aperture 84b.

A concave portion 82 of a surface of a heat transfer member faces to a convex portion 83 of another surface of the heat transfer member each other, and vice versa. The solution or the refrigerant sprinkled from the sprinkling devices located upward squeeze into a vertical concave portion 82 when they flow down. Then, they spread over the horizontal direction by the surface tension and wet whole surface of the heat transfer member 81. Subsequently, concave portions 82 disposed lower are fulfilled with the refrigerant or the solution.

The solution or refrigerant liquid sprinkled from the sprinkling devices 13, 24 are continuously and stably supplied to the surface of the heat transfer member 81 through grooves 84a, apertures 84b and grooves 84c formed in the liquid dropping device 84 with the capillary effect.

Next, still another embodiment of the present invention will be explained. The absorption refrigerator described above is made by the following steps. The absorption refrigerator has a first evaporator, a first absorber, a second evaporator, a second absorber, a regenerator and a condenser. At first, it is welded all-round of a heat transfer member interposed between the first evaporator and the second evaporator at a basal surface and both side surfaces of a rectangular parallelepiped chamber. This parallelepiped chamber has the first absorber, the first evaporator, the second absorber and the second evaporator. Next, a solution sprinkling device and a refrigerant liquid sprinkling device is put inside of the parallelepiped chamber. Finally, all-round of the top surface divided by a portion of the first evaporator and a portion of the second absorber is welded.

As the fine concave portion and the fine convex portions extending horizontally are formed on the surfaces of the heat transfer member 81 in the present invention as described above, the wettability of the heat transfer member is improved and the surface area increases. Therefore, the heat transfer performance per unit area is improved, and the heat exchangers can be down-sized. In addition, the solution and the refrigerant liquid can be stably supplied to the heat transfer member from the liquid dropping device.

Since the heat transfer member is used instead of heat pipes as heat transport means from the second absorber to the first evaporator in all the embodiments described above, heat transfer means are capable with low cost and easily. It can be reduced the pumping power of refrigerant pump of the first evaporator and the solution pump of the second absorber, because the capacity of both pumps is needed only to satisfy an ability to sprinkle the solution or the refrigerant liquid.

In addition, since the refrigerant liquid from the condenser is conducted from the first evaporator to the second evaporator in series, the refrigerant in the first evaporator does not mix with the solution even if the refrigerant in the second evaporator is mixed with the solution, when the cold below 0° C. is taken out from the second evaporator Therefore, the heat transfer performance of the first evaporator does not degenerate. As refrigerant supply means to the second evaporator communicate to the mixed refrigerant liquid in the refrigerant tank, the refrigerant introduced to the second evaporator can be prevented from freezing.

What is claimed is:

1. An absorption refrigerator, comprising:
   a first evaporator;
   a first absorber;
   a regenerator;
   a condenser;
   a second evaporator conducting a refrigerant liquid accumulated in said first evaporator;
   a second absorber absorbing the refrigerant vapor evaporating in said second evaporator;
   a refrigerant liquid control means controlling a flow rate of the refrigerant flowing from said first evaporator for making a concentration of the refrigerant liquid in said second evaporator to a predetermined value; and
   a heat transfer member interposed between said first evaporator and said second absorber;
   wherein said first evaporator, said second evaporator, said first absorber and said second absorber are made of a unitary chamber.

2. An absorption refrigerator according to claim 1, wherein said heat transfer member is a plate corrugated and extending in the vertical direction.

3. An absorption refrigerator according to claim 1, wherein said absorption refrigerator further comprises a conduit introducing a solution from said first absorber to said second absorber, and a heat exchange means exchanging heat between a dilute solution accumulated in said second absorber and the solution introduced in said second absorber.

4. An absorption refrigerator according to claim 1, wherein said refrigerant control means further comprises a level height detecting means detecting a level height of the refrigerant in said second evaporator and a control valve provided in a flow passage for the refrigerant from said first evaporator to said second evaporator.

5. An absorption refrigerator, comprising:
   a regenerator;
   a condenser condensing a refrigerant vapor generated in said regenerator;
   a first evaporator evaporating a refrigerant liquid condensed in said condenser;
   a first absorber absorbing the refrigerant vapor evaporated in said first evaporator into a solution;
   a second evaporator introducing the refrigerant liquid accumulated in said first evaporator;
   a second absorber absorbing the refrigerant vapor evaporating in said second evaporator to the solution; and
   a heat transfer member interposed between said first evaporator and said second absorber;
   wherein said second evaporator, said second absorber, said first evaporator and said firs absorber are located in this order and are made of a unitary chamber, and the refrigerant liquid condensed in said condenser is introduced to said second evaporator through said first evaporator.

6. An absorption refrigerator according to claim 5, wherein said absorption refrigerator further comprises a communicating means for communicating the refrigerant liquid accumulated at a bottom of said first evaporator to the refrigerant liquid accumulated at a bottom of said second evaporator.

7. An absorption refrigerator according to claim 5, wherein said heat transfer member is corrugated when it is viewed in the horizontal section.

8. An absorption refrigerator according to claim 7, wherein said heat transfer member is a plate having a plurality of concave portions and a plurality of convex portions on a surface and extending in the vertical direction.

9. An absorption refrigerator according to claim 5, wherein absorption refrigerator further comprises a refrigerant liquid sprinkling device sprinkling the refrigerant liquid over and in the vicinity of said heat transfer member facing said first evaporator and solution sprinkling device sprinkling the solution over and in the vicinity of said heat transfer member facing said second absorber, and said refrigerant liquid sprinkling device is disposed upper than said solution sprinkling device.

10. An absorption refrigerator according to claim 6, wherein said absorption refrigerator further comprises a refrigerant concentration detecting means for detecting a refrigerant concentration in said second evaporator, a refrigerant liquid flow adjusting means for adjusting a flow rate of the refrigerant liquid passing through said communicating means, and a control means for controlling said refrigerant liquid flow adjusting means based on a concentration of the refrigerant detected by said refrigerant concentration detecting means.

11. An absorption refrigerator according to claim 10, wherein said absorption refrigerator further comprises a level height detecting means of the refrigerant liquid for detecting a level height of the refrigerant liquid in said second evaporator, a refrigerant liquid flow adjusting means for adjusting a flow rate of the refrigerant liquid passing through said communicating means, and a control means for controlling said refrigerant liquid flow adjusting means based on a concentration of the refrigerant detected by said refrigerant concentration detecting means.

12. An absorption refrigerator according to claim 10, wherein said control means further comprises a memory means memorizing at least one of a target value of the refrigerant concentration, an upper limit of a refrigerant liquid level height and a lower limit of the refrigerant liquid level height.

13. An absorption refrigerator according to claim 11, wherein said control means further comprises a memory means memorizing at least one of a target value of the refrigerant concentration, an upper limit of a refrigerant liquid level height and a lower limit of the refrigerant liquid level height.

14. An absorption refrigerator according to claim 1, wherein said absorption refrigerator further comprises a solution supplying means for supplying a portion of the solution from said second absorber to said second evaporator.

15. An absorption refrigerator according to claim 5, wherein said absorption refrigerator further comprises a solution supplying means for supplying a portion of the solution from said second absorber to said second evaporator.

16. A method of producing an absorption refrigerator having a first evaporator, a first absorber, a second evaporator, a second absorber, a regenerator and a condenser said method comprising steps of:

welding a heat transfer member interposed between said first evaporator and said second absorber continuously with a bottom surface and both side surfaces of a rectangular parallelepiped chamber including said first absorber, said first evaporator, said second absorber and said second evaporator;

disposing a solution sprinkling device and a refrigerant liquid sprinkling device; and welding all-around of said top surface divided by a portion of said first evaporator and a portion of said second absorber.

17. An absorption refrigirator, comprising:

a first absorber;

a regenerator;

a condenser;

a second evaporator conducting a refrigerant liquid accumulated in said first evaporator;

a second absorber absorbing the refrigerant vapor evaporating in said second evaporator; and a heat transfer member interposed between said first evaporator and said second absorber;

wherein said first evaporator, said second evaporator, said first absorber and said second absorber are made of a unitary chamber.

18. An absorption refrigirator, according to claim 17, further comprising a level height detector in said second evaporator.

19. An absorption refrigirator, according to claim 17, further comprising a conduit connecting said first evaporator to said second evaporator.

20. An absorption refrigirator, according to claim 17, further comprising a concentration detector in a line connecting a refrigerant tank of said second evaporator with a sprinkling device in an upper portion of the second evaporator.

* * * * *